US012133186B2

(12) United States Patent
Luo et al.

(10) Patent No.: US 12,133,186 B2
(45) Date of Patent: Oct. 29, 2024

(54) DIRECTIONAL MEASUREMENTS FOR SIDELINK SYNCHRONIZATION SIGNAL TRANSMISSION

(71) Applicant: QUALCOMM Incorporated, San Diego, CA (US)

(72) Inventors: Tao Luo, San Diego, CA (US); Sony Akkarakaran, Poway, CA (US); Junyi Li, Fairless Hills, PA (US); Juan Montojo, San Diego, CA (US); Jung Ho Ryu, Fort Lee, NJ (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/301,507

(22) Filed: Apr. 17, 2023

(65) Prior Publication Data
US 2023/0388948 A1    Nov. 30, 2023

Related U.S. Application Data

(62) Division of application No. 16/925,037, filed on Jul. 9, 2020, now Pat. No. 11,632,728.
(Continued)

(51) Int. Cl.
*H04W 56/00* (2009.01)
*H04L 5/00* (2006.01)
(Continued)

(52) U.S. Cl.
CPC ......... *H04W 56/001* (2013.01); *H04L 5/0048* (2013.01); *H04W 24/10* (2013.01);
(Continued)

(58) Field of Classification Search
None
See application file for complete search history.

(56) References Cited

U.S. PATENT DOCUMENTS

| 10,342,019 B2 * | 7/2019 | Xue ................. H04W 72/0453 |
| 2016/0044618 A1 | 2/2016 | Sheng et al. |

(Continued)

FOREIGN PATENT DOCUMENTS

| WO | WO-2017171398 A1 | 10/2017 |
| WO | WO-2018174602 A1 | 9/2018 |
| WO | WO-2019027679 A1 | 2/2019 |

OTHER PUBLICATIONS

International Search Report and Written Opinion—PCT/US2020/041600—ISA/EPO—dated Oct. 16, 2020.

*Primary Examiner* — Yee F Lam
(74) *Attorney, Agent, or Firm* — Arun Swain

(57) ABSTRACT

Methods, systems, and devices for wireless communications are described. Generally, the described techniques provide for indicating a sidelink configuration for synchronization signal transmission. For example, a user equipment (UE) may establish an access link with a base station or transmission/reception point. The UE may measure a plurality of beams of the access link or of a sidelink channel to generate a signal metric of the access link or of the sidelink channel. Based on the generated signal metric, the UE may identify a sidelink configuration for synchronization signal transmission within the sidelink channel. In some cases, the UE may
(Continued)

transmit a synchronization signal via the sidelink channel based at least in part on the sidelink configuration.

18 Claims, 10 Drawing Sheets

Related U.S. Application Data

(60) Provisional application No. 62/875,730, filed on Jul. 18, 2019.

(51) Int. Cl.
*H04W 24/10* (2009.01)
*H04W 36/00* (2009.01)
*H04W 72/04* (2023.01)
*H04W 72/044* (2023.01)
*H04W 74/0816* (2024.01)

(52) U.S. Cl.
CPC ..... *H04W 36/0094* (2013.01); *H04W 72/046* (2013.01); *H04W 74/0816* (2013.01)

(56) References Cited

U.S. PATENT DOCUMENTS

| | | | |
|---|---|---|---|
| 2017/0142703 A1* | 5/2017 | Xue | H04W 8/005 |
| 2018/0278311 A1 | 9/2018 | Qiu et al. | |
| 2019/0045569 A1* | 2/2019 | Abedini | H04W 16/28 |
| 2019/0081843 A1 | 3/2019 | Vaze et al. | |
| 2019/0116605 A1* | 4/2019 | Luo | H04W 72/0446 |
| 2020/0029318 A1 | 1/2020 | Guo | |
| 2020/0036422 A1* | 1/2020 | Li | H04W 74/0808 |
| 2020/0100150 A1 | 3/2020 | Da Silva | |
| 2020/0107303 A1 | 4/2020 | Hahn | |
| 2020/0145079 A1* | 5/2020 | Marinier | H04W 56/0045 |
| 2020/0145867 A1 | 5/2020 | Tseng et al. | |
| 2020/0178221 A1* | 6/2020 | Byun | H04W 72/23 |
| 2020/0252990 A1* | 8/2020 | Ganesan | H04W 76/14 |
| 2020/0295854 A1* | 9/2020 | Narra | H04B 17/21 |
| 2020/0343951 A1* | 10/2020 | Hou | H04B 1/44 |
| 2020/0373988 A1* | 11/2020 | Wang | H04B 7/066 |
| 2021/0022094 A1 | 1/2021 | Luo et al. | |
| 2021/0168574 A1* | 6/2021 | Zhang | H04W 16/28 |

\* cited by examiner

DIRECTIONAL MEASUREMENTS FOR SIDELINK SYNCHRONIZATION SIGNAL TRANSMISSION

CROSS REFERENCE

The present application for patent is a Divisional of U.S. patent application Ser. No. 16/925,037 filed Jul. 9, 2020, which claims the benefit of U.S. Provisional Patent Application No. 62/875,730 filed Jul. 18, 2019, assigned to the assignee hereof, and expressly incorporated by reference herein.

FIELD OF TECHNOLOGY

The following relates generally to wireless communications and more specifically to directional measurements for sidelink synchronization signal transmission.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A wireless multiple-access communications system may include a number of base stations or network access nodes, each simultaneously supporting communication for multiple communication devices, which may be otherwise known as user equipment (UEs). Some wireless communications systems may support direct communications between multiple communication devices. Examples of direct communications may include, but are not limited to, device-to-device (D2D) communications, vehicle-based communications, which may also be referred to as vehicle-to-everything (V2X) networks, vehicle-to-vehicle (V2V) networks, cellular V2X (C-V2X) networks, or the like. As demand for communication efficiency increases, some wireless communications systems may fail to provide satisfactory resource allocation and system synchronization via sidelink communications, and improved techniques may be desired for systems that support direct communications.

SUMMARY

The described techniques relate to improved methods, systems, devices, and apparatuses that support directional measurements for sidelink synchronization signal transmission. Generally, the described techniques provide for indicating a sidelink configuration for synchronization signal transmission. For example, a user equipment (UE) may measure a plurality of beams to generate a signal metric. Based on the generated signal metric, the UE may identify a sidelink configuration for synchronization signal transmission within a sidelink channel. In some cases, the UE may transmit a synchronization signal via the sidelink channel based at least in part on the sidelink configuration. Another UE that receives the synchronization signal may utilize the received signal to synchronize communications via the sidelink channel.

A method of wireless communication by a UE is described. The method may include generating a signal metric based on measuring a set of beams, identifying a sidelink configuration for synchronization signal transmission within a sidelink channel based on the signal metric, and transmitting a synchronization signal via the sidelink channel based on the sidelink configuration.

An apparatus for wireless communication by a UE is described. The apparatus may include a processor, memory coupled with the processor, and instructions stored in the memory. The instructions may be executable by the processor to cause the apparatus to generate a signal metric based on measuring a set of beams, identify a sidelink configuration for synchronization signal transmission within a sidelink channel based on the signal metric, and transmit a synchronization signal via the sidelink channel based on the sidelink configuration.

Another apparatus for wireless communication by a UE is described. The apparatus may include means for generating a signal metric based on measuring a set of beams, identifying a sidelink configuration for synchronization signal transmission within a sidelink channel based on the signal metric, and transmitting a synchronization signal via the sidelink channel based on the sidelink configuration.

A non-transitory computer-readable medium storing code for wireless communication by a UE is described. The code may include instructions executable by a processor to generate a signal metric based on measuring a set of beams, identify a sidelink configuration for synchronization signal transmission within a sidelink channel based on the signal metric, and transmit a synchronization signal via the sidelink channel based on the sidelink configuration.

Some examples of the method, apparatuses, and non-transitory computer-readable medium described herein may further include operations, features, means, or instructions for transmitting an indicator of the sidelink configuration to a second UE via the sidelink channel.

Some examples of the method, apparatuses, and non-transitory computer-readable medium described herein may further include operations, features, means, or instructions for transmitting, via the sidelink channel, an information block having a flag that indicates the synchronization signal may be being transmitted in coverage or out of coverage.

In some examples of the method, apparatuses, and non-transitory computer-readable medium described herein, transmitting the synchronization signal may include operations, features, means, or instructions for transmitting the synchronization signal that corresponds to a synchronization signal identifier selected from an in coverage set or an out of coverage set.

In some examples of the method, apparatuses, and non-transitory computer-readable medium described herein, transmitting the synchronization signal may include operations, features, means, or instructions for transmitting the synchronization signal via the sidelink channel based on the signal metric satisfying a threshold specified in the sidelink configuration.

Some examples of the method, apparatuses, and non-transitory computer-readable medium described herein may further include operations, features, means, or instructions for skipping a subsequent transmission of the synchronization signal via the sidelink channel based on an update to the signal metric not satisfying a threshold specified in the sidelink configuration.

In some examples of the method, apparatuses, and non-transitory computer-readable medium described herein, generating the signal metric may include operations, features, means, or instructions for generating a reference signal measurement for each beam of the set of beams, selecting a defined number of the set of beams having a highest reference signal measurement based on the reference signal measurements, and generating the signal metric as a function of the reference signal measurements for the defined number of the set of beams.

In some examples of the method, apparatuses, and non-transitory computer-readable medium described herein, the function may be an average function, a maximum function, a minimum function, an average function for reference signal measurements that satisfy a threshold, a number of reference signal measurements above or below a threshold for at least one cell, or any combination thereof.

In some examples of the method, apparatuses, and non-transitory computer-readable medium described herein, the reference signal measurement may be a reference signal receive power measurement, a signal to noise ratio, a signal to interference plus noise ratio, a reference signal receive quality measurement, a received signal strength indicator, or any combination thereof.

In some examples of the method, apparatuses, and non-transitory computer-readable medium described herein, identifying the sidelink configuration may include operations, features, means, or instructions for selecting a synchronization signal identifier from an in coverage set or an out of coverage set, where the transmitted synchronization signal corresponds to the selected synchronization signal identifier.

In some examples of the method, apparatuses, and non-transitory computer-readable medium described herein, identifying the sidelink configuration may include operations, features, means, or instructions for setting a flag in an information block for the sidelink configuration to indicate in coverage set or an out of coverage set.

In some examples of the method, apparatuses, and non-transitory computer-readable medium described herein, the information block may be a master information block-sidelink.

In some examples of the method, apparatuses, and non-transitory computer-readable medium described herein, identifying the sidelink configuration may include operations, features, means, or instructions for identifying the sidelink configuration that includes a sidelink synchronization signal configuration for synchronization signal transmission via the sidelink channel based on the signal metric.

In some examples of the method, apparatuses, and non-transitory computer-readable medium described herein, identifying the sidelink configuration may include operations, features, means, or instructions for identifying the sidelink configuration that includes a resource pool configuration for data transmission via the sidelink channel based on the signal metric and one or more beam shapes used for measuring the set of beams.

Some examples of the method, apparatuses, and non-transitory computer-readable medium described herein may further include operations, features, means, or instructions for transmitting or receiving the data transmission via the sidelink channel based on the resource pool configuration.

In some examples of the method, apparatuses, and non-transitory computer-readable medium described herein, generating the signal metric may include operations, features, means, or instructions for generating the signal metric based on measuring the set of beams using a set of antenna panels of the UE.

In some examples of the method, apparatuses, and non-transitory computer-readable medium described herein, generating the signal metric may include operations, features, means, or instructions for periodically generating an update to the signal metric based on measuring the set of beams.

Some examples of the method, apparatus, and non-transitory computer-readable medium described herein may include operations, features, means, or instructions for establishing an access link with a base station or a transmission/reception point, where the signal metric is generated based at least in part on measuring the plurality of beams of the access link.

A method of wireless communication by a first UE is described. The method may include receiving, from a second UE, an indicator of a sidelink configuration for synchronization signal transmission within a sidelink channel, the indicator being based on a signal metric generated from measurements of a set of beams and monitoring for a synchronization signal via the sidelink channel based on the sidelink configuration.

An apparatus for wireless communication by a first UE is described. The apparatus may include a processor, memory coupled with the processor, and instructions stored in the memory. The instructions may be executable by the processor to cause the apparatus to receive, from a second UE, an indicator of a sidelink configuration for synchronization signal transmission within a sidelink channel, the indicator being based on a signal metric generated from measurements of a set of beams and monitor for a synchronization signal via the sidelink channel based on the sidelink configuration.

Another apparatus for wireless communication by a first UE is described. The apparatus may include means for receiving, from a second UE, an indicator of a sidelink configuration for synchronization signal transmission within a sidelink channel, the indicator being based on a signal metric generated from measurements of a set of beams and monitoring for a synchronization signal via the sidelink channel based on the sidelink configuration.

A non-transitory computer-readable medium storing code for wireless communication by a first UE is described. The code may include instructions executable by a processor to receive, from a second UE, an indicator of a sidelink configuration for synchronization signal transmission within a sidelink channel, the indicator being based on a signal metric generated from measurements of a set of beams o and monitor for a synchronization signal via the sidelink channel based on the sidelink configuration.

In some examples of the method, apparatuses, and non-transitory computer-readable medium described herein, monitoring for the synchronization signal may include operations, features, means, or instructions for receiving the synchronization signal via the sidelink channel, and synchronizing with the second UE based on the synchronization signal.

Some examples of the method, apparatuses, and non-transitory computer-readable medium described herein may further include operations, features, means, or instructions for receiving, via the sidelink channel, an information block having a flag that indicates the synchronization signal may be being transmitted in coverage or out of coverage.

In some examples of the method, apparatuses, and non-transitory computer-readable medium described herein, monitoring for the synchronization signal may include operations, features, means, or instructions for receiving the synchronization signal that corresponds to a synchronization signal identifier selected from an in coverage set or an out of coverage set based on the sidelink configuration.

Some examples of the method, apparatuses, and non-transitory computer-readable medium described herein may further include operations, features, means, or instructions for receiving a second indicator of a second sidelink configuration for synchronization signal transmission within the sidelink channel, and skipping monitoring for the synchronization signal via the sidelink channel based on the second sidelink configuration.

Some examples of the method, apparatuses, and non-transitory computer-readable medium described herein may further include operations, features, means, or instructions for receiving the indicator of the sidelink configuration via the sidelink channel.

In some examples of the method, apparatuses, and non-transitory computer-readable medium described herein, the sidelink configuration indicates a synchronization signal identifier for the synchronization signal may be from an in coverage set or an out of coverage set.

Some examples of the method, apparatuses, and non-transitory computer-readable medium described herein may further include operations, features, means, or instructions for receiving an information block including a flag to indicate in coverage set or an out of coverage set for the synchronization signal.

In some examples of the method, apparatuses, and non-transitory computer-readable medium described herein, the information block may be a master information block-sidelink.

In some examples of the method, apparatuses, and non-transitory computer-readable medium described herein, receiving the indicator of the sidelink configuration may include operations, features, means, or instructions for receiving the indicator of the sidelink configuration that includes a sidelink synchronization signal configuration for synchronization signal transmission via the sidelink channel based on the signal metric.

In some examples of the method, apparatuses, and non-transitory computer-readable medium described herein, receiving the indicator of the sidelink configuration may include operations, features, means, or instructions for receiving the indicator of the sidelink configuration that includes a resource pool configuration for data transmission via the sidelink channel based on the signal metric and one or more beam shapes used for measuring the set of beams.

Some examples of the method, apparatuses, and non-transitory computer-readable medium described herein may further include operations, features, means, or instructions for transmitting or receiving the data transmission via the sidelink channel based on the resource pool configuration.

Some examples of the method, apparatuses, and non-transitory computer-readable medium described herein may further include operations, features, means, or instructions for the indicator being based on the measurements of the plurality of beams of an access link between the second UE and the base station.

DETAILED DESCRIPTION

Figure 1:
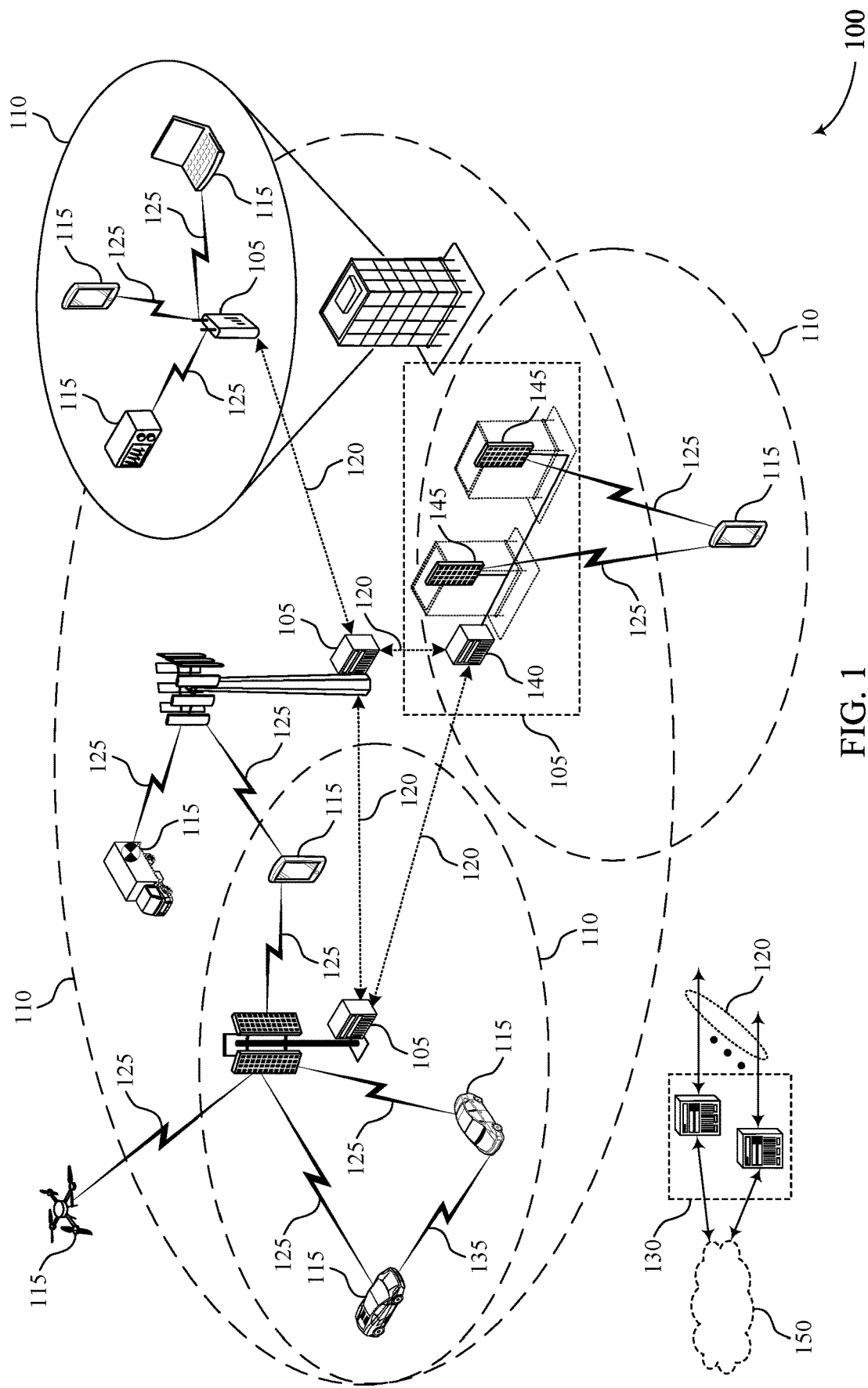
FIG. 1 illustrates an example of a system for wireless communications that supports directional measurements for sidelink synchronization signal transmission in accordance with aspects of the present disclosure.

Some wireless communications systems may support direct communications between multiple communication devices. Examples of direct communications may include, but are not limited to, device-to-device (D2D) communications, vehicle-based communications, which may also be referred to as vehicle-to-everything (V2X) networks, vehicle-to-vehicle (V2V) networks, cellular V2X (C-V2X) networks, or the like. In some examples, direct communications may be performed via sidelink operations, where a communications link other than an access link (e.g., between a UE and a base station) may be used for communicating data directly between wireless devices. Such systems may further support communications using one or more multiple radio access technologies including 4G systems such as Long Term Evolution (LTE) systems, fifth generation (5G) systems which may be referred to as New Radio (NR) systems, and Wi-Fi systems (e.g., wireless local area network (WLAN) systems).

In some cases, UEs may utilize certain techniques to determine whether the UE is in coverage of a serving cell. Based on the determination, the UE may transmit an indication (e.g., a flag in a sidelink master information block (MIB-SL)) of whether the UE is in the coverage of the serving cell. Other receiving UEs within a geographic proximity of the transmitting UE may receive the indication via direct communication and may use the indication to determine the reliability of the UE as a synchronization source. The transmitting UE may also transmit one or more synchronization signals, which the receiving UEs may utilize to synchronize communications within the wireless network such that the receiving UEs may communicate with the serving cell.

In some cases, a wireless communications system may support communication on various radio frequency spectrum bands (e.g., including FR1 (450 to 6000 MHz), FR2 (24250 to 52600 MHz), and so forth). As such, base stations and UEs may operate in millimeter wave (mmW) frequency ranges, e.g., 28 gigahertz (GHz), 40 GHz, 60 GHz, etc. Wireless communications at these frequencies may be associated with increased signal attenuation (e.g., pathloss), which may be influenced by various factors, such as temperature, barometric pressure, diffraction, blockage, etc. As a result, signal processing techniques, such as beamforming, may be used to coherently combine energy and overcome the pathlosses at these frequencies. Such signal processing techniques may therefore also be used for direct communications between two or more wireless devices in the system. However, as demand for communications efficiency increases, improved techniques may be desired for direct communications.

Generally, the techniques described herein enable communication synchronization within a wireless network supporting direct communications between devices as well as beamforming for improved signal quality. For instance, a first UE (e.g., a managing UE or transmitting UE), may establish an access link with a base station or a transmission/reception point. The first UE may measure a plurality of beams of the access link to generate a signal metric and identify a sidelink configuration for synchronization signal transmission within a sidelink channel based at least in part on the signal metric. In some cases (e.g., when the metrics indicate that the UE is at a distance from the serving cell), the UE may determine to transmit a synchronization signal via the sidelink channel based on the identified configuration. One or more second UEs (e.g., managed UEs or receiving UEs) may receive the synchronization signal via the sidelink channel and utilize the synchronization signal to synchronize communications with the wireless network (e.g., the serving cell).

In some cases, the first UE may transmit an indicator of the sidelink configuration and/or an indication of whether the synchronization signal is being transmitted by a UE that is in coverage or out of coverage. The second UEs may utilize such information to determine whether to utilize the received synchronization signal for communication synchronization. In some examples, generation of the signal metric includes generating a reference signal measurement of each of the plurality of beams of the access link, selecting a defined number of beams having a highest reference signal measurement, and generating the signal metric as a function of the reference signal measurements for the defined number of beams. The function may be an average function, a maximum function, a minimum function, an average function for reference signal measurements that satisfy a threshold, a number of reference signal measurements above or below a threshold for at least one cell (e.g., a serving cell may be comprised of multiple transmission/reception points serving a given UE or other device), or any combination thereof. Accordingly, the first UE may determine whether to transmit a synchronization signal via a sidelink channel and/or a sidelink configuration for synchronization signal transmission via the sidelink channel. The one or more second UEs may receive sidelink channel configuration information and/or the synchronization signal and determine whether to utilize the synchronization signal for synchronization with the wireless network.

Aspects of the subject matter described herein may be implemented one or more potential advantages. For instance, the described techniques may support improvement in reliability and enhanced overaged through the signaling of synchronization configuration information via sidelink communications, among other advantages. Aspects of the disclosure are initially described in the context of wireless communications systems. Aspects of the disclosure are further described with respect to a wireless communications system, a timing diagram, and a process flow diagram. Aspects of the disclosure are further illustrated by and described with reference to apparatus diagrams, system diagrams, and flowcharts that relate to directional measurements for sidelink synchronization signal transmission.

FIG. 1 illustrates an example of a wireless communications system 100 that supports directional measurements for sidelink synchronization signal transmission in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a particular carrier bandwidth or may be configurable to support communications over one of a set of carrier bandwidths. In some examples, the wireless communications system 100 may include base stations 105 and/or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into BWPs having the same or different numerologies. In some examples, a UE 115 may be configured with multiple BWPs. In some cases, a single BWP for a carrier is active at a given time, and communications for the UE 115 may be restricted to active BWPs.

Time intervals for base stations 105 or UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM)

techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to UEs 115 with service subscriptions with the network provider or may provide restricted access to UEs 115 having an association with the small cell (e.g., UEs 115 in a closed subscriber group (CSG) UEs 115 associated with users in a home or office, and the like). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a predefined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some cases, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some cases, transmissions by a device (e.g., by a base station 105 or UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

A device (e.g., a first UE 115) may transmit synchronization signals to other UEs 115 using a sidelink channel, and the other UEs may utilize the synchronization signal to establish communications with a serving cell. When the first UE 115 is nearby the serving cell, transmission of synchronization signals may not benefit other devices, as the base station 105 may serve as a proper synchronization source. However, when the first UE 115 is not in geographic proximity to the serving cell, the other UEs 115 may benefit from the transmission of the synchronization signal by the first UE 115 via a sidelink channel. In such cases, the UEs 115 may synchronize using the synchronization signal, which may support cell range expansion (e.g., other devices out of serving cell coverage may communicate). The first UE 115 may determine whether to transmit a synchronization signal and a synchronization signal configuration (e.g., from an in coverage set or an out of coverage set) based on RSRP on an active beam. In systems that support beamforming for improved signal quality, transmission of the synchronization signal using beamforming may be unreliable due to orientation and blocking of other devices. Further, utilization of RSRP (based on a beamformed signal) may not serve as a quality indication that other nearby devices may also receive a quality signal from the serving cell (e.g., because of blocking or orientation).

Further, some systems may deploy multiple transmission/reception points to improve robustness of the wireless communications system 100 by offering improved spatial coverage (e.g., in mmW bands or other higher bands). In some cases, the transmission/reception points may utilize the same or different physical cell identifiers and may incorporate repeaters to expand coverage in specific beam directions. Accordingly, RSRP of a beamformed and repeated signal may not be a quality indicator that other nearby devices may also receive a quality signal from the serving cell. Additionally, a device (e.g., the first UE 115) may vary a digital or analog codebook for analog beamforming. Accordingly, a specific measurement for RSRP may widely vary depending on the beam and/or codebook used by the UE 115.

Accordingly, the UEs 115 may support generation of a signal metric of a plurality of beams on an access link established with a base station 105 or transmission/reception point. The signal metric may be a function of a plurality of reference signal measurements of the plurality of beams. In some cases, the function is an average function, a maximum function, a minimum function, an average function for a reference signal measurements that satisfy a threshold, a number of references signal measurements above a threshold of at least one cell, or combination thereof. Based on the signal metric of the plurality of beams, the UE 115 may identify a sidelink configuration for synchronization signal transmission within a sidelink channel. Thus, the configuration may be based on a plurality of beams rather than a single RSRP, and the configuration may include whether to transmit or not transmit a synchronization signal, whether to choose a synchronization signal identifier from an in coverage set or out of coverage set, whether to set a flag in MIB-SL to indicate in coverage or out of coverage, resource pools for sidelink communications, or a combination thereof. Using the plurality of beams as the basis of a synchronization signal may provide a higher quality indicator that other nearby UEs 115 may receive a quality signal from the serving cell (e.g., because the transmitting UE 115 is using multiple beams that may be used to communicate with the nearby UEs 115). This technique may improve overall signal quality and reliability within the wireless communications system 100.

Figure 2:
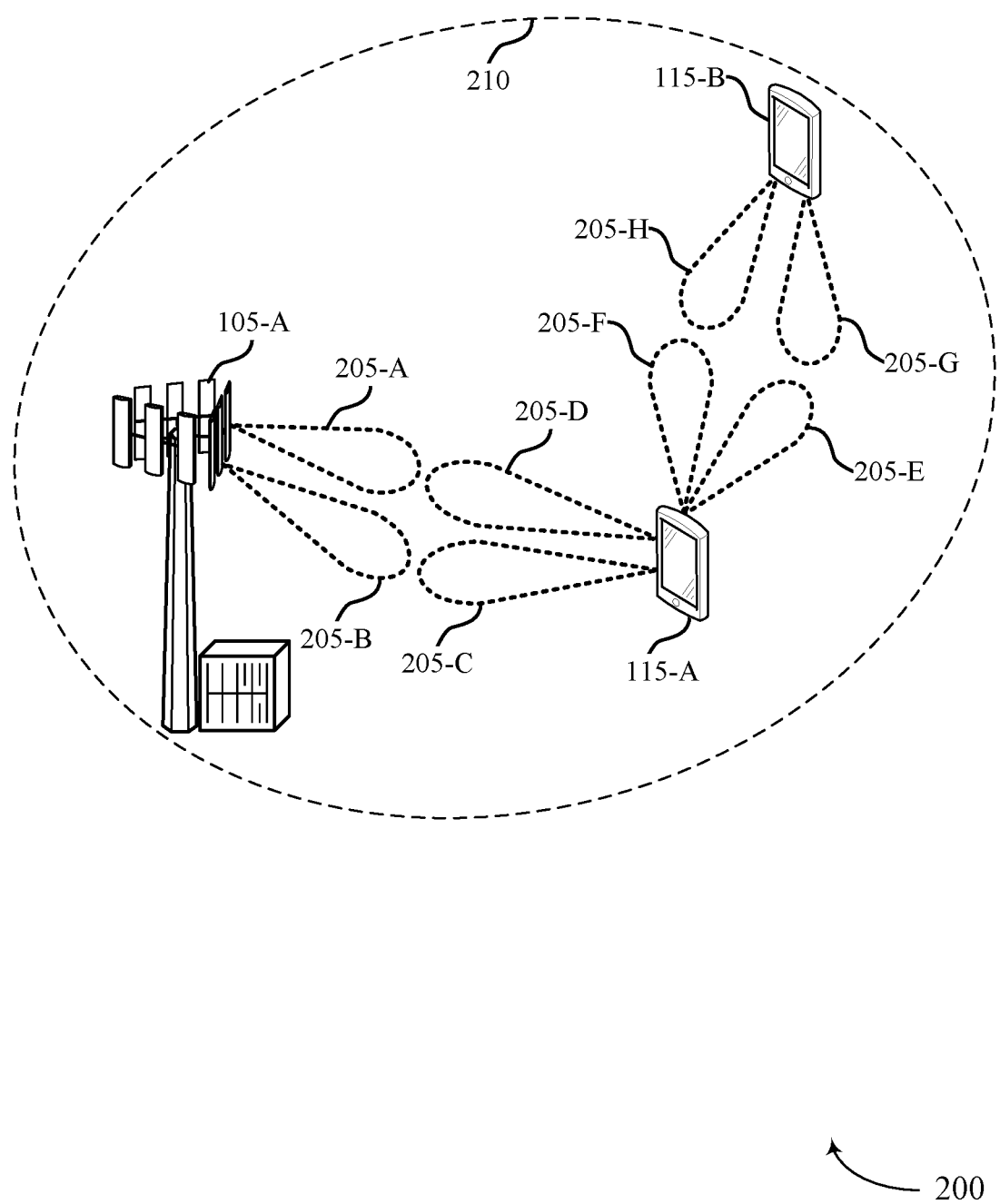
FIG. 2 illustrates an example of a wireless communications system in accordance with aspects of the present disclosure.

FIG. 2 illustrates an example of a wireless communications system 200 in accordance with aspects of the present disclosure. In some examples, the wireless communications system 200 may implement aspects of wireless communications system 100. The wireless communications system 200 includes a base station 105-a, which may also be referred to as a transmission/reception point, and UEs 115-a and 115-b. UEs 115 in the wireless communications system 200 may support access channel and sidelink communications using directional (e.g., beamformed) transmissions. The wireless communications system 200 may also support directional measurements for sidelink synchronization signal transmission.

In wireless communications system 200, base station 105-a may communicate with one or more UEs 115 in a geographic coverage area 210 over an access link. In some examples, the access link may be an example of a communication link 125 described with reference to FIG. 1, and may correspond to a radio interface (e.g., a Uu interface) between a UE 115 and a radio access network. Base station 105 a may transmit control information (e.g., including downlink control information (DCI) 210) and data on the downlink to UE 115-a over access link. Likewise, UE 115-a may communicate control information and data to base station 105-a on the uplink using access link. In the illustrated example, access link may be a directional link (e.g., beamformed) between base station 105 a and UE 115-a comprising one or more beams 205 (e.g., 205-a, 205-b, 205-c, and 205-d).

Additionally, a UE 115 may utilize a sidelink communication link (e.g., a sidelink channel between two wireless devices) to communicate with another UE 115. Sidelink communication link may be an example of a communication link 135 described with reference to FIG. 1. In some cases, a UE 115 may be capable of communicating with one or multiple other devices using respective sidelink communication links. As an example, UE 115-a may communicate with UE 115-b using a first sidelink communication link. The UEs 115 that communicate over a sidelink communication link may accordingly transmit control information and data over the sidelink channel. In some examples, the sidelink communication link(s) may correspond to a radio interface between two devices that may not require assistance from a network (such as a PC5 or V2X interface). As described herein, each sidelink communication link may be a directional link between devices, for example, formed using beams 205-e, 205-f, 205-g, and 205-h (such as with mmW communications).

Control information and data may be communicated by each UE 115 over a sidelink communication link, which may be transmitted using time/frequency resources in uplink spectrum. In some cases, control resources and respective data resources in the uplink spectrum may be used for communications over a sidelink. In some cases, resources in the uplink spectrum may be optionally configured or scheduled by base station 105-a. For instance, base station 105-a may transmit a downlink scheduling grant and data via a downlink spectrum, where the downlink scheduling grant may include an indication of control resources and data resources that may be used by one or more UEs 115 (e.g., for sidelink communications). In other cases, the resources used to transmit the control information and data may be determined from a set of resources configured for sidelink communications. In some cases, the resources used for control information and data in uplink spectrum may span different time periods (or symbol periods).

UE 115-a may periodically transmit synchronization signals to other UEs, such as UE 115-b using a sidelink channel, and the other UEs 115 may utilize the synchronization signal to synchronize communications with the serving cell (e.g., base station 105-a). When the UE 115-a is in geographic proximity (e.g., within coverage area 210), transmission of synchronization signals may not benefit other UEs 115, such as UE 115-b, as the base station 105-a may serve as a synchronization source. However, when UE 115-a is near or outside the geographic coverage area 210, then other UEs 115, such as UE 115-b, may benefit from the transmission of the synchronization signal by the UE 115-*a* via the sidelink channel. In such cases, the UE 115-*b* may utilize the synchronization signal to synchronize communication with the base station 105-*a*. These synchronization techniques may effectively expand the coverage area 210 (e.g., cell range expansion), thereby improving communication range and reliability.

To determine sidelink synchronization signal configurations, UE 115-*a* (e.g., a managing or transmitting UE) may measure reference signals on a plurality of beams 205 of an access link established between UE 115-*a* and base station 105-*a*. The measurements may include reference signal receive power measurement, a signal to noise ratio, a signal to interference plus noise ratio, a reference signal receive quality measurement, a received signal strength indicator, or any combination thereof. Based on the measurements, the base station 105-*a* may generate a signal metric and identify a sidelink configuration for synchronization signal transmission within a sidelink channel based at least in part on the signal metric. In some cases, the UE 115-*a* may transmit a synchronization signal (e.g., to the UE 115-*b*) via the sidelink channel based at least in part on the sidelink configuration. For example, if the signal metric indicates that UE 115-*a* is approaching, nearby, or outside the geographic coverage area 210, then the UE 115-*a* may determine to transmit the synchronization signal. In contrast, if the signal metrics indicate (e.g., high received power over many beams) that the UE 115-*a* is within the coverage area 210, then the UE 115-*a* may determine to not transmit the synchronization signal.

In some cases, the UE 115-*a* may set a flag in an information block and transmit the information block for the sidelink configuration to indicate an in coverage set or an out of coverage set for the synchronization signal. In some cases, the information block may be an example of a master information block-sidelink (MIB-SL). Based on the information block, the UE 115-*a* may transmit a synchronization signal that corresponds to a synchronization signal identifier selected from the in coverage set or the out of coverage set.

In examples, the sidelink configuration identified based on the signal metric may include a resource pool configuration for data transmission via the sidelink channel. The resource pool may be further selected based on one or more beam shapes used for measuring the plurality of beams of the access link. For example, a measured RSRP may depend on the extent of a reception (RX) beam (e.g., beam 205-*d*) refinement. The resource pool may be selected from a plurality of resource pools allocated (e.g., by the base station 105-*a*) for sidelink communication. For example, the base station 105-*a* may allocate resources (e.g., via a grant) for a cell-center (e.g., near the center of coverage area 210) pool, resources for a cell edge (e.g., near the edge of coverage area 210) pool, and other resources therebetween. In some cases, the shape of an RX beam used in the RSRP measurement may be related to a TX beam used for transmission of a sidelink synchronization signal with regard to resource pool selection. In one example, if UE 115-*a* measures a high RSRP because of a narrow beam, then the UE 115-*a* may select a cell-center resource pool. However, in this case, if the UE 115-*a* uses a broad beam for sidelink, then the sidelink may not have enough power for transmission (e.g., sidelink communications may not reach beyond cell-edge/coverage area 210). Conversely, if the UE 115-*a* measures a low RSRP because of a broad beam, then the UE 115-*a* may select a cell-edge resource pool. However, the UE 115-*a* may be unnecessarily limited in Tx power on the sidelink channel to avoid interference to a neighboring cell. Accordingly, the UE 115-*a* may consider both Rx beam width on the access link as well as sidelink beam width on the sidelink to determine the resource pool configuration, and/or to select one or more resources from the resource pool for sidelink communication. In some cases, one resource pool or resource pool configuration may be allocated for one or more narrow beams and another resource pool or resource pool configuration may be allocated for one or more broad beams. Further, within one set of beams (broad or narrow) the shapes may not be exactly identical. For example, beams pointing to the endfire of the antenna array may be broader than those pointing to the boresight. As such, the selected resource pool or resource pool configuration may be dependent on the various beam widths use to measure the plurality of beams.

Based on a synchronization signal received from the UE 115-*a*, UE 115-*b* may synchronize communications with base station 105-*a*. In some cases, UE 115-*b* may receive an indicator of the sidelink configuration for the synchronization signal transmission within the sidelink channel and from UE 115-*a*. The UE 115-*b* may then monitor for transmission of the synchronization signal by the UE 115-*a* based on the sidelink configuration. In some examples, the UE 115-*b* may synchronize with UE 115-*a* based at least in part on the synchronization signal.

Figure 3:
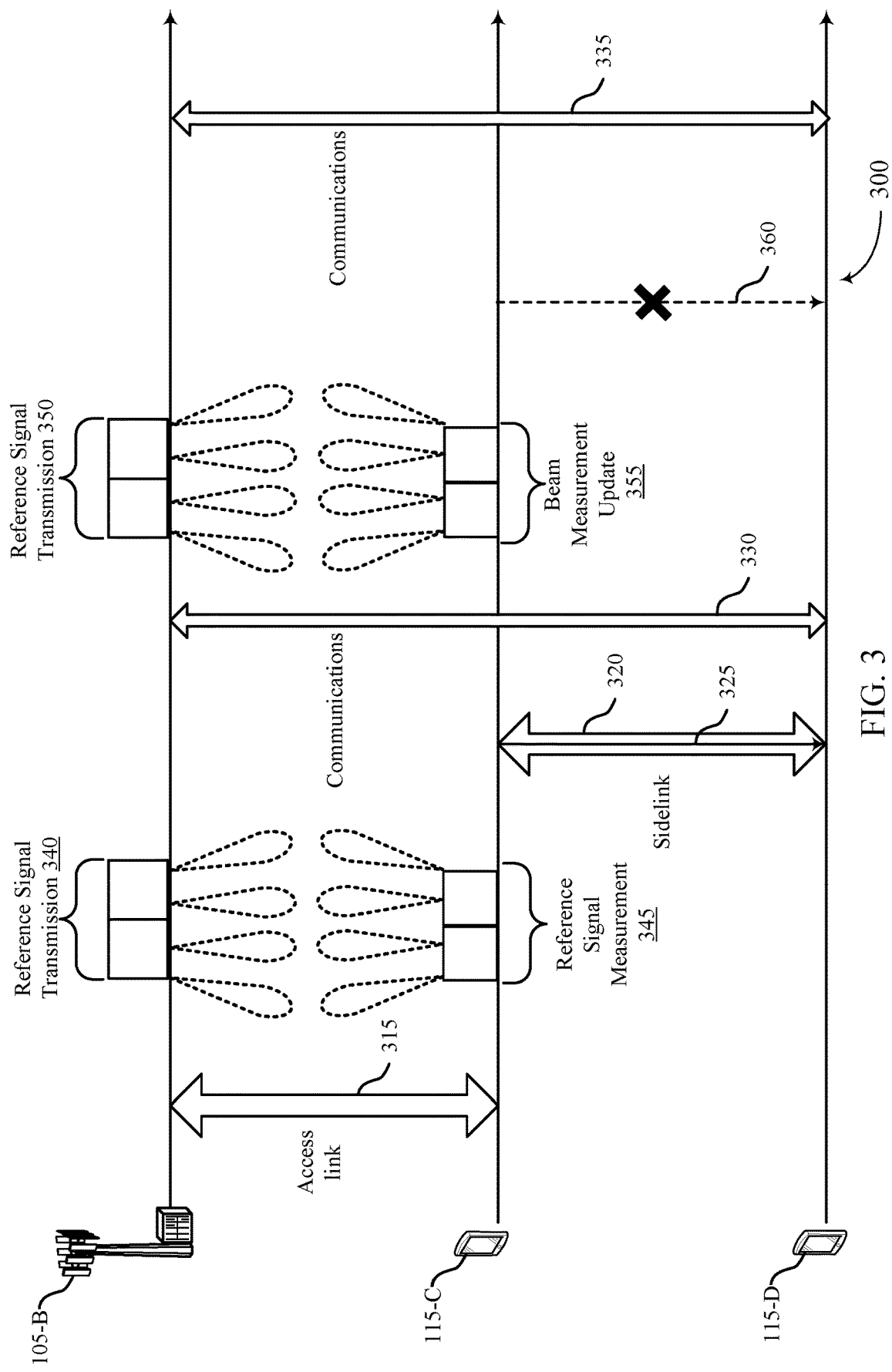
FIG. 3 illustrates an example of a timing diagram in accordance with aspects of the present disclosure.

FIG. 3 illustrates an example of a timing diagram 300 in accordance with aspects of the present disclosure. In some examples, timing diagram 300 may implement aspects of wireless communications system 100 and wireless communications system 200. The timing diagram 300 includes base station 105-*b*, UE 115-*c*, and UE 115-*d*, which may be examples of corresponding devices of FIGS. 1 and 2. UE 115-*c* may be an example of a managing or transmitting UE, and the UE 115-*d* may be an example of a managed or receiving UE.

The UE 115-*c* and 105-*b* may establish an access link 315 for downlink and uplink data and control communications. The access link 315 may be established via random access procedures, for example. The access link 315 may be a beamformed mmW communication link. At 340, the base station 105-*b* may transmit a series of reference signals over downlink resources and using a plurality of beams. At 345, UE 115-*c* may generate measurements of the reference signals transmitted by the base station 105-*b* over resources allocated for downlink communication. In some cases, transmission of the reference signals over the plurality of beams and measurements of the reference signals may be considered a beam sweep procedure. In some cases, the reference signal measurement is a reference signal receive power measurement, a signal to noise ratio, a signal to interference plus noise ratio, a reference signal receive quality measurement, a received signal strength indicator, or any combination thereof. The UE 115-*c* may generate a signal metric based at least in part on measuring the plurality of beams (e.g., measurements of reference signals transmitted on the beams).

In some cases, generation of the signal metric may be based on a function of the measurements for the defined number of beams. For example, the function may include selecting a defined number of beams having a highest reference signal measurement (e.g., best M RSRP measurements over different beams for a given serving cell, best N RSRP measurements over different beams for one or multiple TRPs, etc.), and averaging the reference signal measurements for the selected beams. As another example of the function, the metric is generated based on the average power of the n beams having power measurements above a threshold. The function may include a maximum function (e.g., maximum received power), a minimum function, or any combination of these. In some examples, the signal metric output by the function may reflect overall quality of the measurements for a given device, and may consider multiple beams for a given TRP, multiple TRP and/or panels at a base station, and/or multiple panels at UE 115-c.

UE 115-c may identify a sidelink configuration for synchronization signal transmission within a sidelink channel based on the signal metric. In some cases, the configuration includes whether the UE 115-c transmits a synchronization signal, the synchronization signal identifier (e.g., chosen from an in coverage set or an out of coverage set), an information block configuration (e.g., setting a flag to indicate that a synchronization signal is transmitted in coverage or out of coverage), a resource pool, etc. For example, the UE 115-c may transmit a sidelink information block (MIB-SL) to the UE 115-d with a flag set to indicate whether the synchronization signal is being transmitted in coverage or out of coverage. The UE 115-c may transmit a synchronization signal 325 over sidelink 320 to the UE 115-d.

The UE 115-d may utilize the any received configuration information (e.g., the coverage flag) and the synchronization signal 325 to synchronize with the UE 115-c and the base station 105-b. Based on the synchronization, the UE 115-c and UE 115-d may transmit communications 330 (e.g., uplink and downlink) with the base station 105-b.

At 350, the base station 105-b may perform additional reference signal transmissions over the plurality of beams and using downlink resources. At 355, the UE 115-c may perform a beam measurement and update the signal metric. Based on the signal metric, the UE 115-c may determine to skip a subsequent transmission 360 of the synchronization signal over the sidelink channel 320. In one example, the signal metric may indicate that the UE 115-c is within a coverage area of the base station 105-b, and thus transmission of a synchronization signal may not benefit any nearby UEs 115, such as UE 115-d. Stated differently, the UE 115-d may synchronize directly with the base station 105-b. UE 115-c and UE 115-d may transmit communications 335 with the base station 105-b based on direct synchronization with the base station 105-b.

In some cases, the UE 115-c may measure a set of beams on a sidelink between UE 115-c and UE 115-d. Thus, the UE 115-c may generate the signal metric (using the techniques described herein) based on the sidelink beam measurements. Based on the signal metric that is associated with sidelink beam measurements, the UE 115-c may identify the sidelink configuration of synchronization signal transmission within the sidelink channel. Thus, as described herein, the UE 115-c may measure access link beams, sidelink beams, or a combination thereof to determine the sidelink configuration of the synchronization channel transmission and transmit the synchronization signal based on the configuration.

Figure 4:
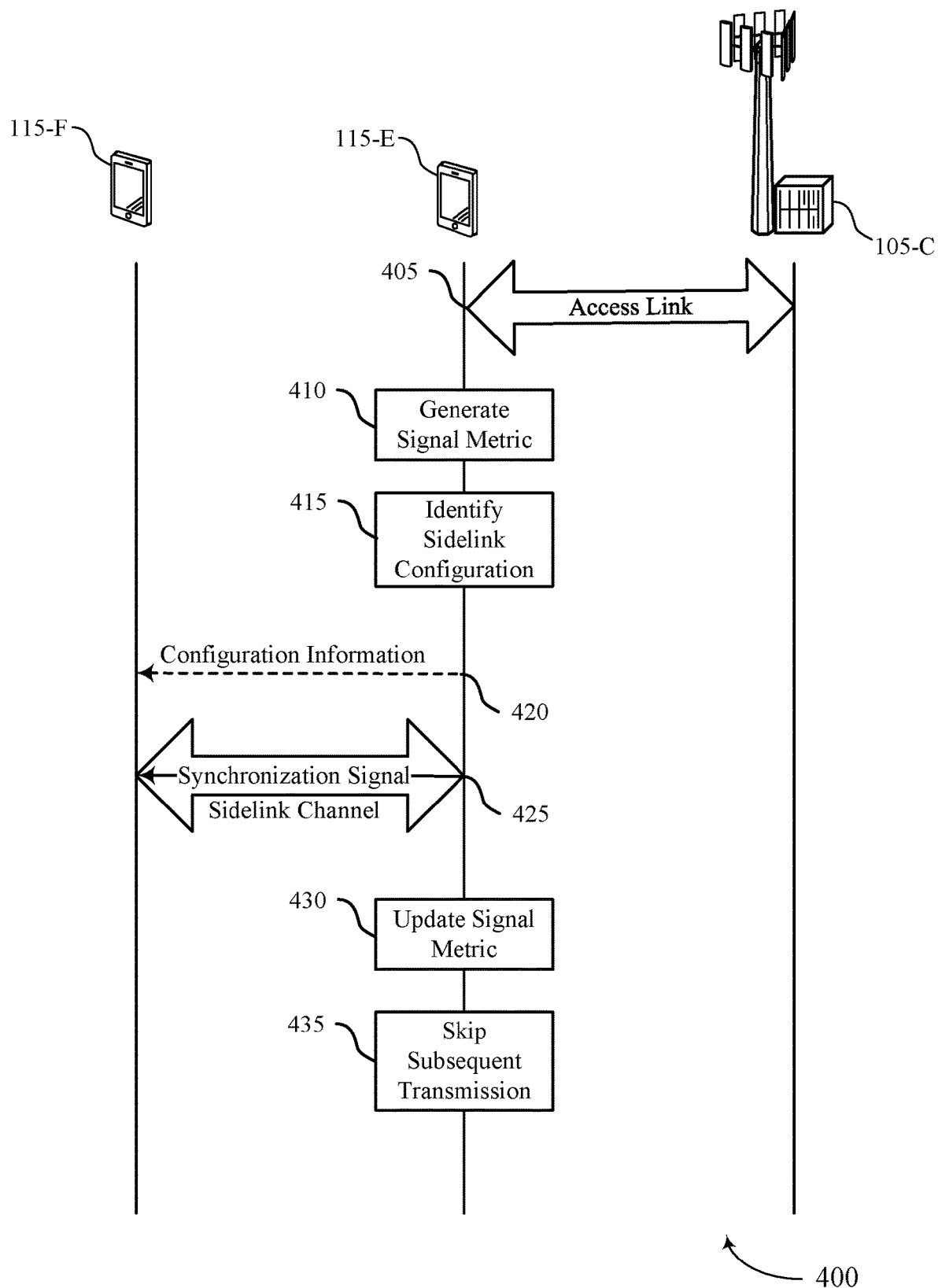
FIG. 4 illustrates an example of a process flow diagram in accordance with aspects of the present disclosure.

FIG. 4 illustrates an example of a process flow diagram 400 in accordance with aspects of the present disclosure. In some examples, process flow diagram 400 may implement aspects of wireless communications system 100. The process flow diagram 400 may include a base station 105-c, a UE 115-e, and a UE 115-f, which may be examples of the corresponding devices of FIGS. 1-3.

At 405, the UE 115-e establishes an access link with base station 105-c (e.g., or a transmission/reception point). The access link may correspond to a radio interface (e.g., a Uu interface) and may be established via random access or other procedures. At 410, UE 115-e generates a signal metric based at least in part on measuring a plurality of beams of the access link.

At 415, UE 115-e identifies a sidelink configuration for synchronization signal transmission within a sidelink channel based at least in part on the signal metric. In some cases, the configuration includes whether the UE 115-c transmits a synchronization signal, the synchronization signal identifier (e.g., from an in coverage, partially in coverage, or out of coverage set), an information block configuration (e.g., setting a flag to indicate that a synchronization signal is transmitted by a UE that is in coverage or out of coverage), a resource pool, a signal metric threshold, etc. At 420, UE 115-e may transmit the sidelink configuration information to UE 115-f, and the UE 115-f may receive an indicator of the sidelink configuration for the synchronization signal transmission within a sidelink channel. The configuration information may include an information block with a flag indicating whether a synchronization signal is in coverage or out of coverage (or a multi-bit flag indicating in coverage, out of coverage, or partially in coverage and out of coverage). The configuration information may further include a synchronization signal identifier selected from an in coverage set or an out of coverage set, the identified resource pool, etc.

At 425, UE 115-e transmits a synchronization signal via the sidelink channel based at least in part on the sidelink configuration. UE 115-f may monitor for and receive the synchronization signal via the sidelink channel based on the received indication. The UE 115-f may synchronize with the UE 115-e based at least in part on the synchronization signal. The UE 115-f may then communicate with base station 105-c based at least in part on the synchronized signals.

At 430, UE 115-e may update the signal metric based on new measurements of the plurality of beams for the access link. For example, the relative position of the UE 115-e and the base station 105-c may change over time, conditions of a wireless channel may vary over time, or the like. At 435, UE 115-e may skip subsequent transmission of the synchronization signal via the sidelink channel based at least in part on an update to the signal metric not satisfying a threshold specified in the identified sidelink configuration. For example, UE 115-e may determine, based on the updated signal metric, not to transmit a synchronization signal as the base station 105-c may operate as a suitable synchronization source.

In some cases, the UE 115-e may generate the signal metric at 410 based on measurements of a sidelink channel between the UE 115-e and the UE 115-f rather than, or in addition to, the access link. As such, the sidelink configuration may be determined based on the measurements of reference signals transmitted on the sidelink channel.

Figure 5:
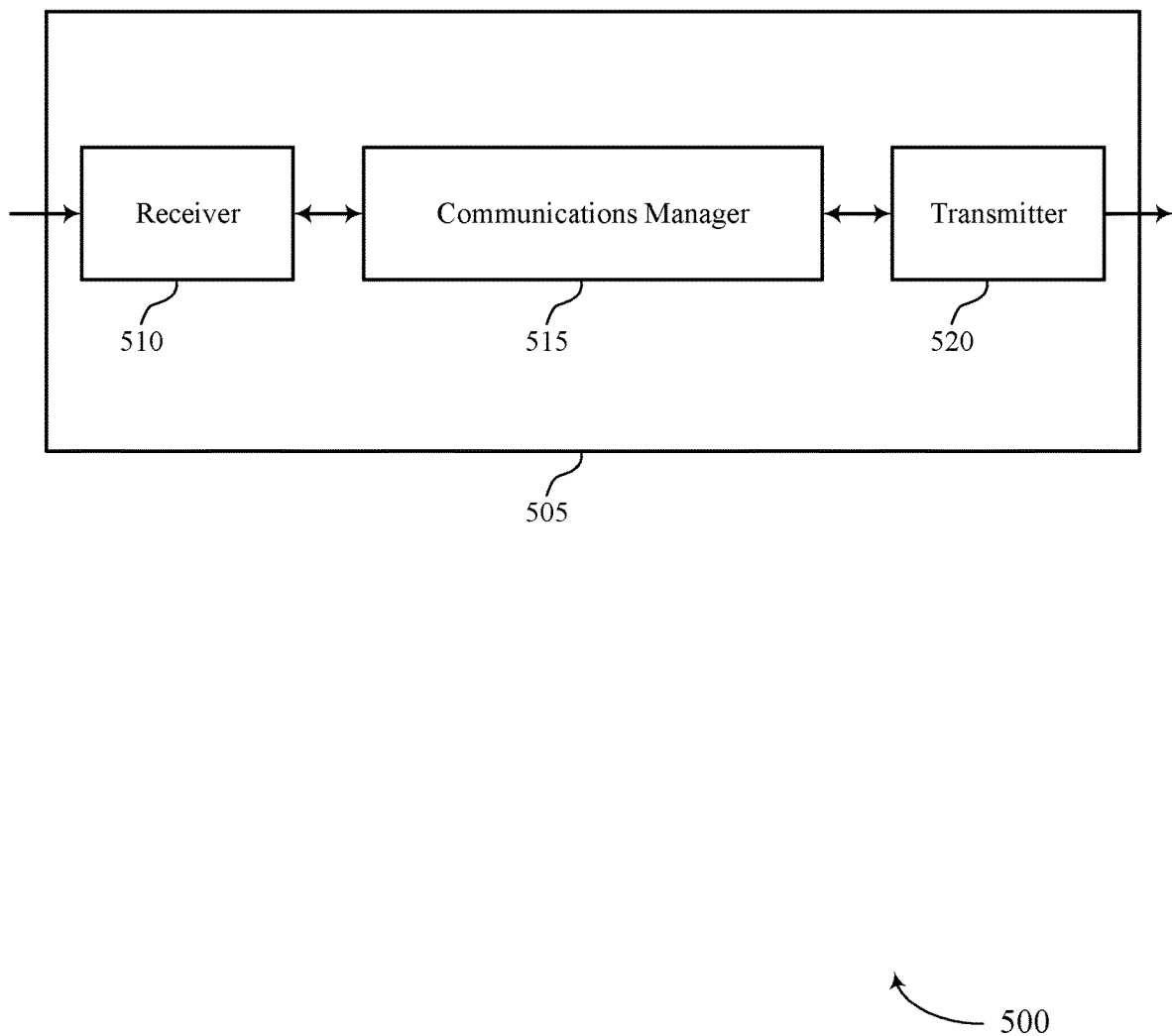
FIGS. 5 and 6 show block diagrams of devices in accordance with aspects of the present disclosure.

FIG. 5 shows a block diagram 500 of a device 505 in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to directional measurements for sidelink synchronization signal transmission, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may generate a signal metric based on measuring a set of beams, identify a sidelink configuration for synchronization signal transmission within a sidelink channel based on the signal metric, and transmit a synchronization signal via the sidelink channel based on the sidelink configuration. The communications manager 515 may also receive, from a second UE, an indicator of a sidelink configuration for synchronization signal transmission within a sidelink channel, the indicator being based on a signal metric generated from measurements of a set of beams of and monitor for a synchronization signal via the sidelink channel based on the sidelink configuration. The communications manager 515 may be an example of aspects of the communications manager 810 described herein.

In some examples, the communications manager 515 may establish an access link with a base station or transmission/reception point. The signal metric may be generated by the communications manager 515 based on the measuring of the set of beams of the access link. In some examples, the communications manager 515 may generate the signal measurement based on the measuring of the set of beams on a sidelink between the first UE and the base station.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, the communications manager 515 may be implemented as an integrated circuit or chipset for a mobile device modem, and the receiver 510 and transmitter 520 may be implemented as analog components (e.g., amplifiers, filters, antennas) coupled with the mobile device modem to enable wireless transmission and reception over one or more bands.

The communications manager 515 as described herein may be implemented to realize one or more potential advantages. One implementation may allow the device 505 to more efficiently coordinate communication with other UEs 115, and more specifically to determine synchronization signal configurations based on a plurality of beam measurements of an access link. For example, the device 505 may identify a configuration to use for transmitting a synchronization signal to other UEs via one or more sidelink channels, based on beam measurements.

Based on implementing the sidelink synchronization signal configuration techniques as described herein, a processor of a UE 115 (e.g., controlling the receiver 810, the transmitter 820, or the transceiver 1120 as described with reference to FIG. 11) may increase reliability and decrease signaling overhead in the communication synchronization signal because the configuration may be determined based on a plurality of beam measurements.

Figure 6:
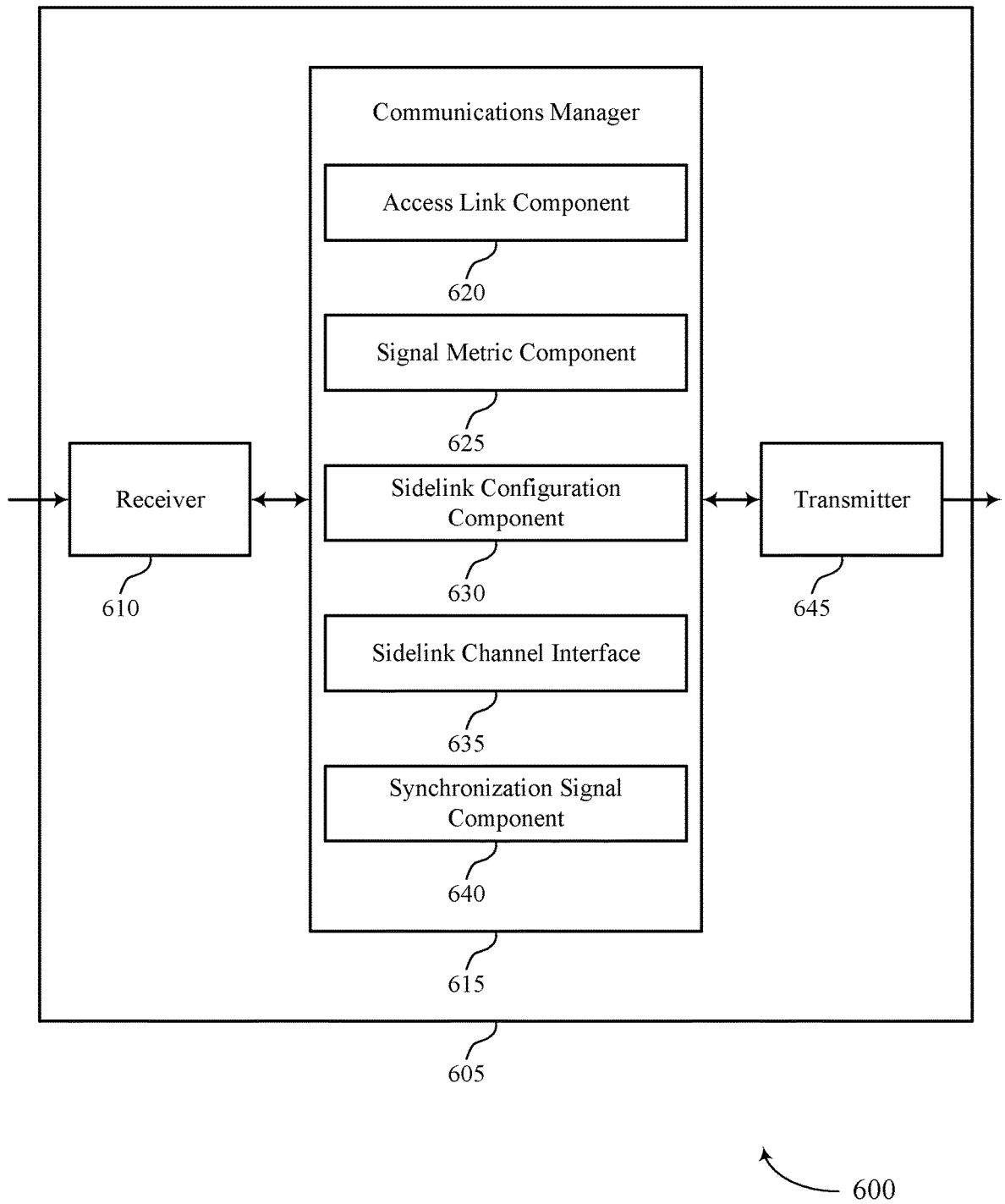

FIG. 6 shows a block diagram 600 of a device 605 in accordance with aspects of the present disclosure. The device 605 may be an example of aspects of a device 505, or a UE 115 as described herein. The device 605 may include a receiver 610, a communications manager 615, and a transmitter 645. The device 605 may also include a processor. Each of these components may be in communication with one another (e.g., via one or more buses).

The receiver 610 may receive information such as packets, user data, or control information associated with various information channels (e.g., control channels, data channels, and information related to directional measurements for sidelink synchronization signal transmission, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include an access link component 620, a signal metric component 625, a sidelink configuration component 630, a sidelink channel interface 635, and a synchronization signal component 640. The communications manager 615 may be an example of aspects of the communications manager 810 described herein.

The access link component 620 may establish an access link with a base station or a transmission/reception point. The signal metric component 625 may generate a signal metric based on measuring a set of beams of the access link.

The sidelink configuration component 630 may identify a sidelink configuration for synchronization signal transmission within a sidelink channel based on the signal metric. The sidelink channel interface 635 may transmit a synchronization signal via the sidelink channel based on the sidelink configuration.

The sidelink channel interface 635 may receive, from a second UE, an indicator of a sidelink configuration for synchronization signal transmission within a sidelink channel, the indicator being based on a signal metric generated from measurements of a set of beams. The set of beams may correspond to an access link between the second UE and the base station or a sidelink between the first UE and the second UE. The synchronization signal component 640 may monitor for a synchronization signal via the sidelink channel based on the sidelink configuration.

The transmitter 645 may transmit signals generated by other components of the device 605. In some examples, the transmitter 645 may be collocated with a receiver 610 in a transceiver module. For example, the transmitter 645 may be an example of aspects of the transceiver 820 described with reference to FIG. 8. The transmitter 645 may utilize a single antenna or a set of antennas.

Figure 7:
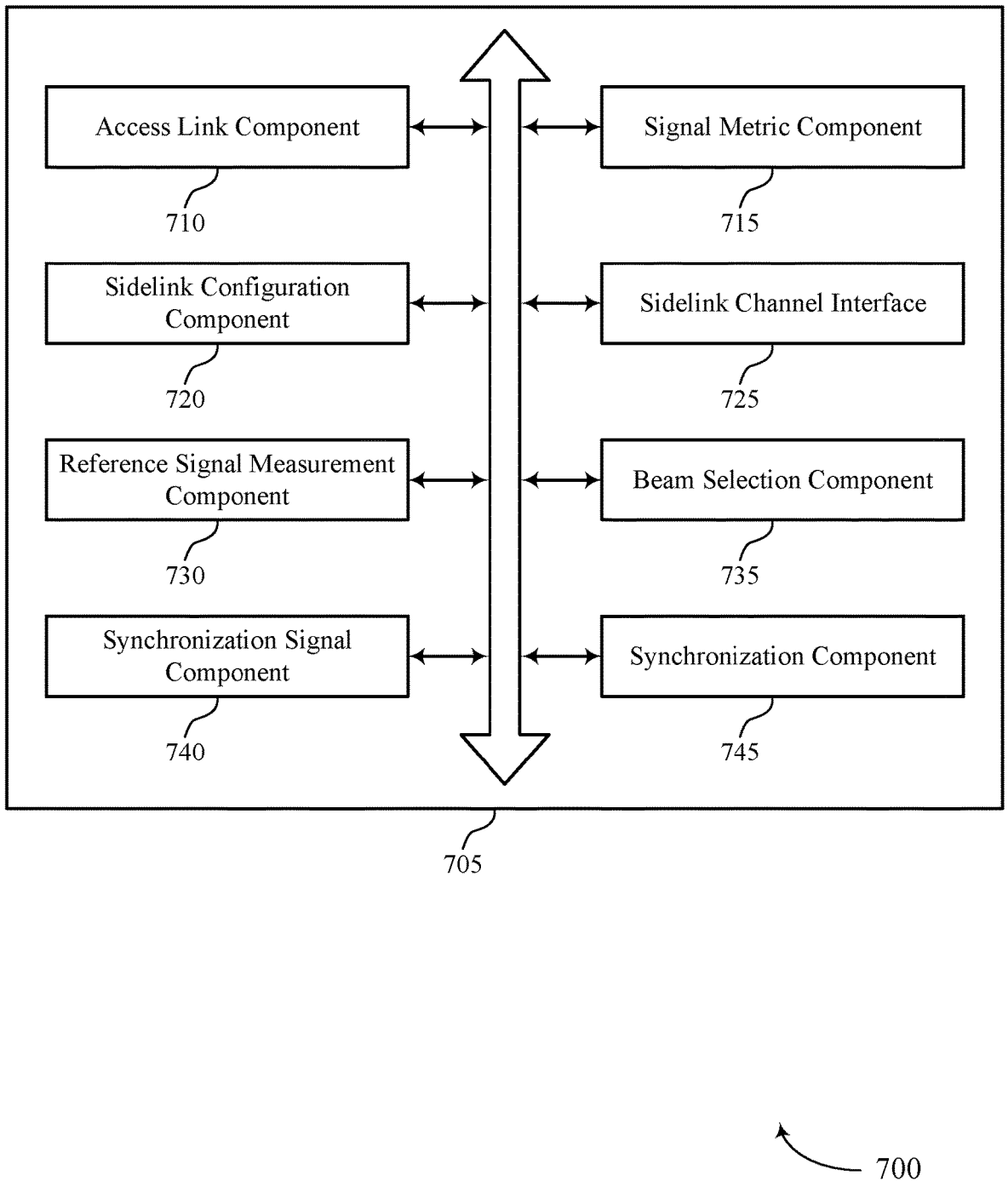
FIG. 7 shows a block diagram of a communications manager in accordance with aspects of the present disclosure.

FIG. 7 shows a block diagram 700 of a communications manager 705 in accordance with aspects of the present disclosure. The communications manager 705 may be an example of aspects of a communications manager 515, a communications manager 615, or a communications manager 810 described herein. The communications manager 705 may include an access link component 710, a signal metric component 715, a sidelink configuration component 720, a sidelink channel interface 725, a reference signal measurement component 730, a beam selection component 735, a synchronization signal component 740, and a synchronization component 745. Each of these modules may communicate, directly or indirectly, with one another (e.g., via one or more buses).

The access link component 710 may establish an access link with a base station or a transmission/reception point. The signal metric component 715 may generate a signal metric based on measuring a set of beams of the access link or of a sidelink. In some examples, the signal metric component 715 may skip a subsequent transmission of the synchronization signal via the sidelink channel based on an update to the signal metric not satisfying a threshold specified in the sidelink configuration.

In some examples, the signal metric component 715 may generate the signal metric as a function of the reference signal measurements for the defined number of the plurality of beams. In some examples, the signal metric component 715 may generate the signal metric based on measuring the set of beams using a set of antenna panels of the UE. In some examples, the signal metric component 715 may periodically generate an update to the signal metric based on measuring the set of beams of the access link. In some cases, the function is an average function, a maximum function, a minimum function, an average function for reference signal measurements that satisfy a threshold, a number of reference signal measurements above or below a threshold for at least one cell, or any combination thereof. In some examples, the signal metric component 715 may generate the signal metric based on measuring the plurality of beams of the access link.

The sidelink configuration component 720 may identify a sidelink configuration for synchronization signal transmission within a sidelink channel based on the signal metric. In some examples, the sidelink configuration component 720 may select a synchronization signal identifier from an in coverage set or an out of coverage set, where the transmitted synchronization signal corresponds to the selected synchronization signal identifier. In some examples, the sidelink configuration component 720 may set a flag in an information block for the sidelink configuration to indicate in coverage set or an out of coverage set.

In some examples, identifying the sidelink configuration that includes a sidelink synchronization signal configuration for synchronization signal transmission via the sidelink channel based on the signal metric. In some examples, identifying the sidelink configuration that includes a resource pool configuration for data transmission via the sidelink channel based on the signal metric and one or more beam shapes used for measuring the set of beams of the access link.

In some examples, receiving the indicator of the sidelink configuration that includes a sidelink synchronization signal configuration for synchronization signal transmission via the sidelink channel based on the signal metric.

In some examples, receiving the indicator of the sidelink configuration that includes a resource pool configuration for data transmission via the sidelink channel based on the signal metric and one or more beam shapes used for measuring the set of beams of the access link. In some cases, the information block is a master information block-sidelink.

The sidelink channel interface 725 may transmit a synchronization signal via the sidelink channel based on the sidelink configuration. In some examples, the sidelink channel interface 725 may receive, from a second UE, an indicator of a sidelink configuration for synchronization signal transmission within a sidelink channel, the indicator being based on a signal metric generated from measurements of a set of beams of an access link between the second UE and a base station.

In some examples, the sidelink channel interface 725 may transmit an indicator of the sidelink configuration to a second UE via the sidelink channel. In some examples, the sidelink channel interface 725 may transmit, via the sidelink channel, an information block having a flag that indicates the synchronization signal is being transmitted in coverage or out of coverage.

In some examples, the sidelink channel interface 725 may transmit the synchronization signal that corresponds to a synchronization signal identifier selected from an in coverage set or an out of coverage set. In some examples, the sidelink channel interface 725 may transmit the synchronization signal via the sidelink channel based on the signal metric satisfying a threshold specified in the sidelink configuration.

In some examples, the sidelink channel interface 725 may transmit or receiving the data transmission via the sidelink channel based on the resource pool configuration. In some examples, the sidelink channel interface 725 may receive the synchronization signal via the sidelink channel.

In some examples, the sidelink channel interface 725 may receive, via the sidelink channel, an information block having a flag that indicates the synchronization signal is being transmitted in coverage or out of coverage. In some examples, the sidelink channel interface 725 may skip monitoring for the synchronization signal via the sidelink channel based on the second sidelink configuration.

In some examples, the sidelink channel interface 725 may receive the indicator of the sidelink configuration via the sidelink channel. In some examples, the sidelink channel interface 725 may receive an information block including a flag to indicate in coverage set or an out of coverage set for the synchronization signal. In some examples, the sidelink channel interface 725 may transmit or receiving the data transmission via the sidelink channel based on the resource pool configuration. In some cases, the sidelink configuration indicates a synchronization signal identifier for the synchronization signal is from an in coverage set or an out of coverage set. In some cases, the information block is a sidelink master information block (MIB).

The synchronization signal component 740 may monitor for a synchronization signal via the sidelink channel based on the sidelink configuration. In some examples, the synchronization signal component 740 may receive the synchronization signal that corresponds to a synchronization signal identifier selected from an in coverage set or an out of coverage set based on the sidelink configuration.

In some examples, the synchronization signal component 740 may receive a second indicator of a second sidelink configuration for synchronization signal transmission within the sidelink channel. The reference signal measurement component 730 may generate a reference signal measurement for each beam of the set of beams.

In some cases, the reference signal measurement is a reference signal receive power measurement, a signal to noise ratio, a signal to interference plus noise ratio, a reference signal receive quality measurement, a received signal strength indicator, or any combination thereof.

The beam selection component 735 may select a defined number of the plurality of beams having a highest reference signal measurement based on the reference signal measurements. The synchronization component 745 may synchronize with the second UE based on the synchronization signal.

Figure 8:
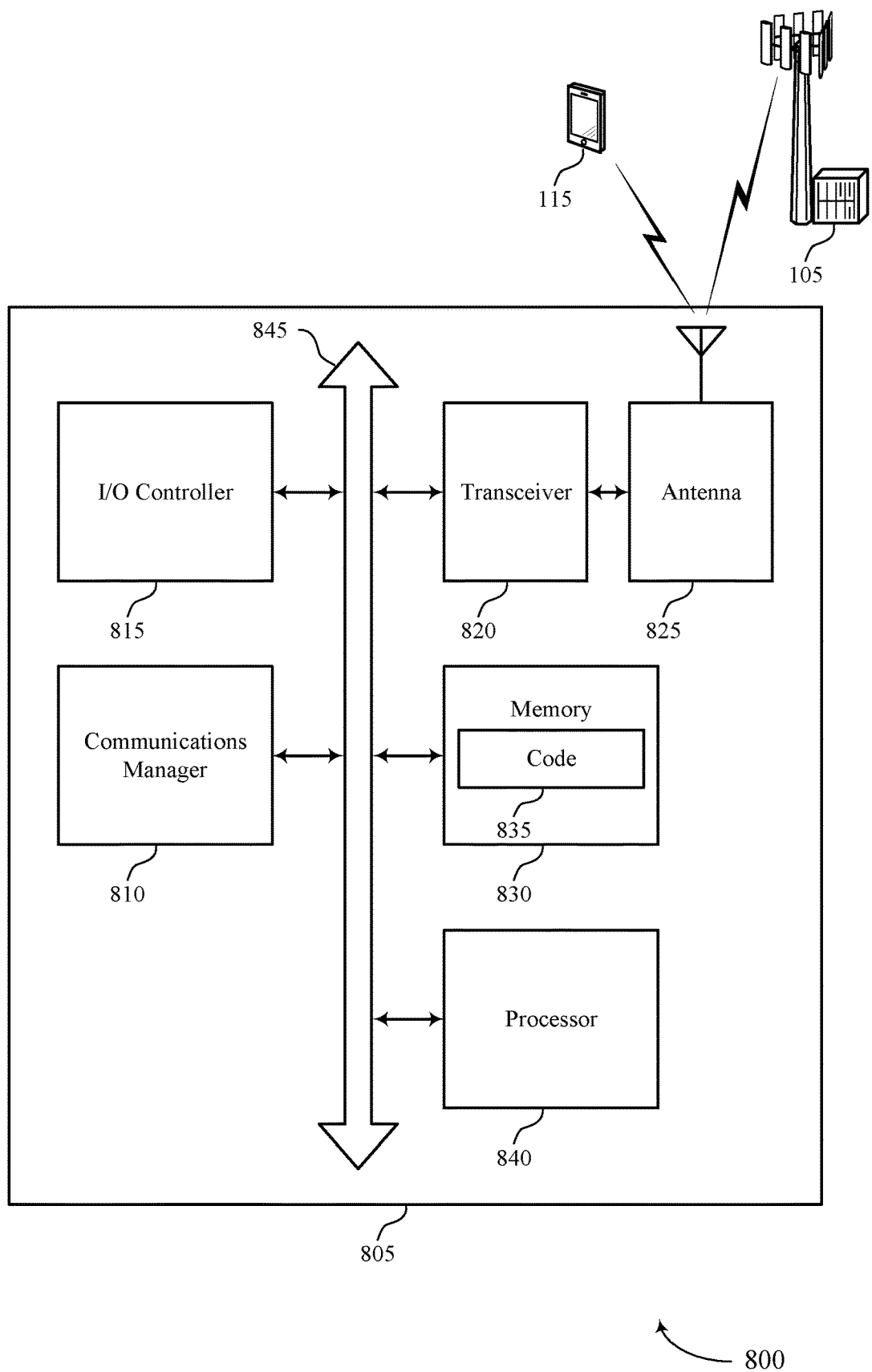
FIG. 8 shows a diagram of a system including a device in accordance with aspects of the present disclosure.

FIG. 8 shows a diagram of a system 800 including a device 805 in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may establish an access link with a base station or a transmission/reception point, generate a signal metric based on measuring a set of beams of the access link, identify a sidelink configuration for synchronization signal transmission within a sidelink channel based on the signal metric, and transmit a synchronization signal via the sidelink channel based on the sidelink configuration. The communications manager 810 may also receive, from a second UE, an indicator of a sidelink configuration for synchronization signal transmission within a sidelink channel, the indicator being based on a signal metric generated from measurements of a set of beams of an access link between the second UE and a base station and monitor for a synchronization signal via the sidelink channel based on the sidelink configuration.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a digital signal processor (DSP), a CPU, a microcontroller, an ASIC, an field-programmable gate array (FPGA), a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting directional measurements for sidelink synchronization signal transmission).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
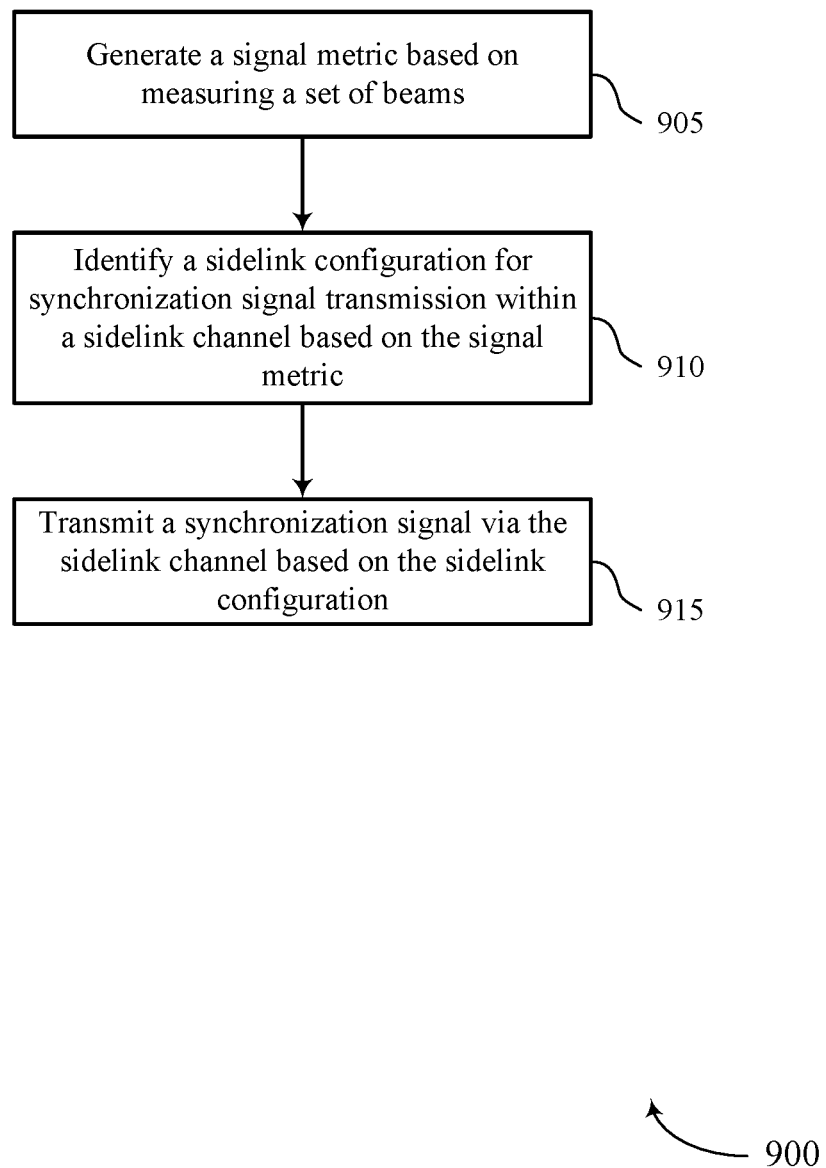
FIGS. 9 and 10 show flowcharts illustrating methods in accordance with aspects of the present disclosure.

FIG. 9 shows a flowchart illustrating a method 900 in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the UE generate a signal metric based on measuring a set of beams. The operations of 910 may be performed according to the methods described herein. In some examples, aspects of the operations of 910 may be performed by a signal metric component as described with reference to FIGS. 5 through 8.

At 910, the UE may identify a sidelink configuration for synchronization signal transmission within a sidelink channel based on the signal metric. The operations of 915 may be performed according to the methods described herein. In some examples, aspects of the operations of 915 may be performed by a sidelink configuration component as described with reference to FIGS. 5 through 8.

At 915, the UE may transmit a synchronization signal via the sidelink channel based on the sidelink configuration. The operations of 920 may be performed according to the methods described herein. In some examples, aspects of the operations of 920 may be performed by a sidelink channel interface as described with reference to FIGS. 5 through 8.

Figure 10:
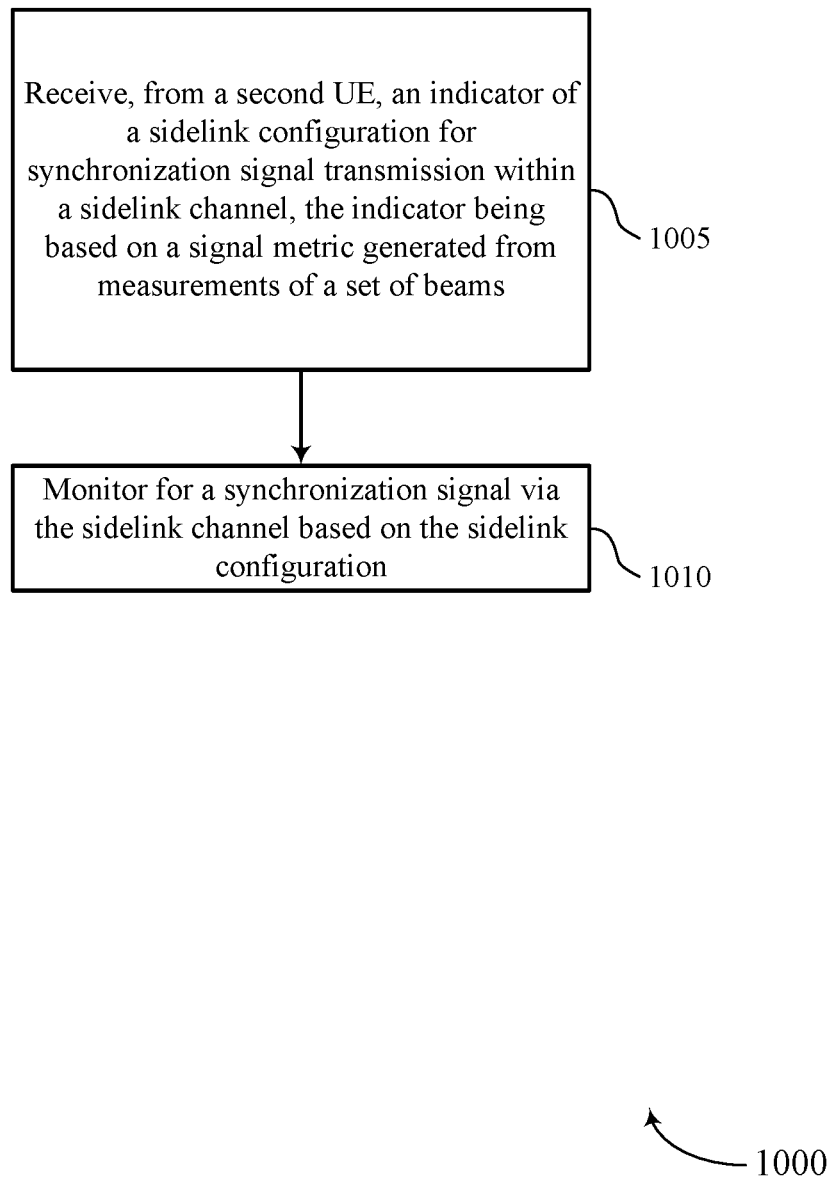

FIG. 10 shows a flowchart illustrating a method 1000 in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1005, the UE may receive, from a second UE, an indicator of a sidelink configuration for synchronization signal transmission within a sidelink channel, the indicator being based on a signal metric generated from measurements of a set of beams. The operations of 1005 may be performed according to the methods described herein. In some examples, aspects of the operations of 1005 may be performed by a sidelink channel interface as described with reference to FIGS. 5 through 8.

At 1010, the UE may monitor for a synchronization signal via the sidelink channel based on the sidelink configuration. The operations of 1010 may be performed according to the methods described herein. In some examples, aspects of the operations of 1010 may be performed by a synchronization signal component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a first user equipment (UE), comprising:
   receiving, from a second UE, an indicator of a sidelink configuration for synchronization signal transmission within a sidelink channel, the indicator being based on a signal metric generated from measurements of a plurality of beams;
   monitoring for a synchronization signal via the sidelink channel based at least in part on the sidelink configuration;
   receiving a second indicator of a second sidelink configuration for synchronization signal transmission within the sidelink channel; and
   skipping monitoring for the synchronization signal via the sidelink channel based at least in part on the second sidelink configuration.

2. The method of claim 1, wherein monitoring for the synchronization signal comprises:
   receiving the synchronization signal from the second UE via the sidelink channel; and
   synchronizing with the second UE based at least in part on the synchronization signal.

3. The method of claim 1, further comprising:
   receiving, via the sidelink channel, an information block having a flag that indicates the synchronization signal is being transmitted in coverage or out of coverage.

4. The method of claim 1, wherein monitoring for the synchronization signal comprises:
   receiving the synchronization signal that corresponds to a synchronization signal identifier selected from an in coverage set or an out of coverage set based at least in part on the sidelink configuration.

5. The method of claim 1, further comprising:
   receiving the indicator of the sidelink configuration via the sidelink channel.

6. The method of claim 1, wherein the sidelink configuration indicates a synchronization signal identifier for the synchronization signal is from an in coverage set or an out of coverage set.

7. The method of claim 1, further comprising:
   receiving an information block comprising a flag to indicate in coverage set or an out of coverage set for the synchronization signal.

8. The method of claim 1, wherein receiving the indicator of the sidelink configuration comprises:
   receiving the indicator of the sidelink configuration that comprises a sidelink synchronization signal configuration for synchronization signal transmission via the sidelink channel based at least in part on the signal metric.

9. The method of claim 1, wherein receiving the indicator of the sidelink configuration comprises:
   receiving the indicator of the sidelink configuration that comprises a resource pool configuration for data transmission via the sidelink channel based at least in part on the signal metric and one or more beam shapes used for measuring the plurality of beams.

10. The method of claim 1, wherein the indicator is based on the measurements of the plurality of beams of an access link between the second UE and a network entity.

11. An apparatus for wireless communication by a first user equipment (UE), comprising:
    a processing system that includes one or more processors and one or more memories coupled with the one or more processors, the processing system configured to cause the apparatus to:
    receive, from a second UE, an indicator of a sidelink configuration for synchronization signal transmission within a sidelink channel, the indicator being based on a signal metric generated from measurements of a plurality of beams;
    monitor for a synchronization signal via the sidelink channel based at least in part on the sidelink configuration;
    receive a second indicator of a second sidelink configuration for synchronization signal transmission within the sidelink channel; and
    skip monitoring for the synchronization signal via the sidelink channel based at least in part on the second sidelink configuration.

12. The apparatus of claim 11, wherein the processing system configured to cause the apparatus to monitor for the synchronization signal is further configured to cause the apparatus to:
    receive the synchronization signal from the second UE via the sidelink channel; and
    synchronize with the second UE based at least in part on the synchronization signal.

13. The apparatus of claim 11, wherein the processing system is further configured to cause the apparatus to:
    receive, via the sidelink channel, an information block having a flag that indicates the synchronization signal is being transmitted in coverage or out of coverage.

14. The apparatus of claim 11, wherein the processing system is further configured to cause the apparatus to:
    receive the synchronization signal that corresponds to a synchronization signal identifier selected from an in coverage set or an out of coverage set based at least in part on the sidelink configuration.

15. The apparatus of claim 11, wherein the processing system is further configured to cause the apparatus to:
    receive the indicator of the sidelink configuration via the sidelink channel.

16. The apparatus of claim 11, wherein the sidelink configuration indicates a synchronization signal identifier for the synchronization signal is from an in coverage set or an out of coverage set.

17. The apparatus of claim 11, wherein the processing system is further configured to cause the apparatus to:
    receive an information block comprising a flag to indicate in coverage set or an out of coverage set for the synchronization signal.

18. The apparatus of claim 11, wherein the processing system is further configured to cause the apparatus to:
   receive the indicator of the sidelink configuration that comprises a sidelink synchronization signal configuration for synchronization signal transmission via the sidelink channel based at least in part on the signal metric.

\* \* \* \* \*